(12) United States Patent
Busser et al.

(10) Patent No.: US 10,098,280 B2
(45) Date of Patent: Oct. 16, 2018

(54) CROP LOSS INHIBITING DEVICE

(71) Applicants: Monte Busser, Colton, SD (US);
Curtis R. Theisen, Dell Rapids, SD (US)

(72) Inventors: Monte Busser, Colton, SD (US);
Curtis R. Theisen, Dell Rapids, SD (US)

( * ) Notice: Subject to any disclaimer, the term of this patent is extended or adjusted under 35 U.S.C. 154(b) by 256 days.

(21) Appl. No.: 15/131,705

(22) Filed: Apr. 18, 2016

(65) Prior Publication Data
US 2017/0295722 A1    Oct. 19, 2017

(51) Int. Cl.
*A01D 41/12* (2006.01)
*A01D 41/06* (2006.01)

(52) U.S. Cl.
CPC ............. *A01D 41/12* (2013.01); *A01D 41/06* (2013.01)

(58) Field of Classification Search
CPC ......... A01D 41/12; A01D 41/14; A01D 41/06
USPC ....................... 56/12.8, 12.9, 13.1
See application file for complete search history.

(56) References Cited

U.S. PATENT DOCUMENTS

| | | | |
|---|---|---|---|
| 859,602 A * | 7/1907 | Green | |
| 1,794,658 A * | 3/1931 | Walsh | A01D 57/10 56/1 |
| 2,670,586 A * | 3/1954 | Phillips | A01D 57/10 56/1 |
| 2,718,744 A * | 9/1955 | Phillips | A01D 57/10 56/1 |
| 2,734,331 A * | 2/1956 | Phillips | A01D 57/10 56/1 |
| 2,832,187 A * | 4/1958 | Johnson | A01D 41/1252 37/238 |
| 3,165,874 A * | 1/1965 | Osteen | A01D 57/10 56/1 |
| 3,961,465 A | 6/1976 | Winings | |
| 4,303,373 A * | 12/1981 | Polhemus | A01D 45/30 415/206 |
| 4,430,849 A | 2/1984 | Wilson et al. | |
| RE32,679 E | 5/1988 | Brooks | |
| 5,959,218 A | 9/1999 | Strubbe | |
| 7,870,713 B2 * | 1/2011 | Schroeder | A01D 57/10 56/12.8 |
| 8,591,301 B2 | 11/2013 | Redekop et al. | |

(Continued)

FOREIGN PATENT DOCUMENTS

WO    WO2009024954    2/2009

*Primary Examiner* — John Weiss

(57) ABSTRACT

A crop loss inhibiting device directs air flow upwardly into cut plants to prevent crops from falling to the ground prior to being collected by a combine. The device includes a combine having a head including a skid plate and a plurality of spaced cutting projections extending forwardly from the skid plate. The combine has a collector positioned rearwardly from the spaced cutting projections wherein the collector receives and collects plants cut by the spaced cutting projections. Each of a pair of manifold tubes is coupled to the combine rearwardly of the spaced cutting projections. Each of the manifold tubes has a plurality of holes facing upwardly away from the spaced cutting projections. A blower is coupled to the manifold tubes creating air flow out through the holes such that the air flow inhibits crops from falling to the ground prior to being collected by the collector.

10 Claims, 4 Drawing Sheets

(56) References Cited

U.S. PATENT DOCUMENTS

2008/0276590 A1\* 11/2008 Sauerwein ............. A01D 41/14
56/153
2014/0250853 A1 9/2014 Young et al.
2016/0316620 A1\* 11/2016 Allochis ................ A01D 34/18

\* cited by examiner

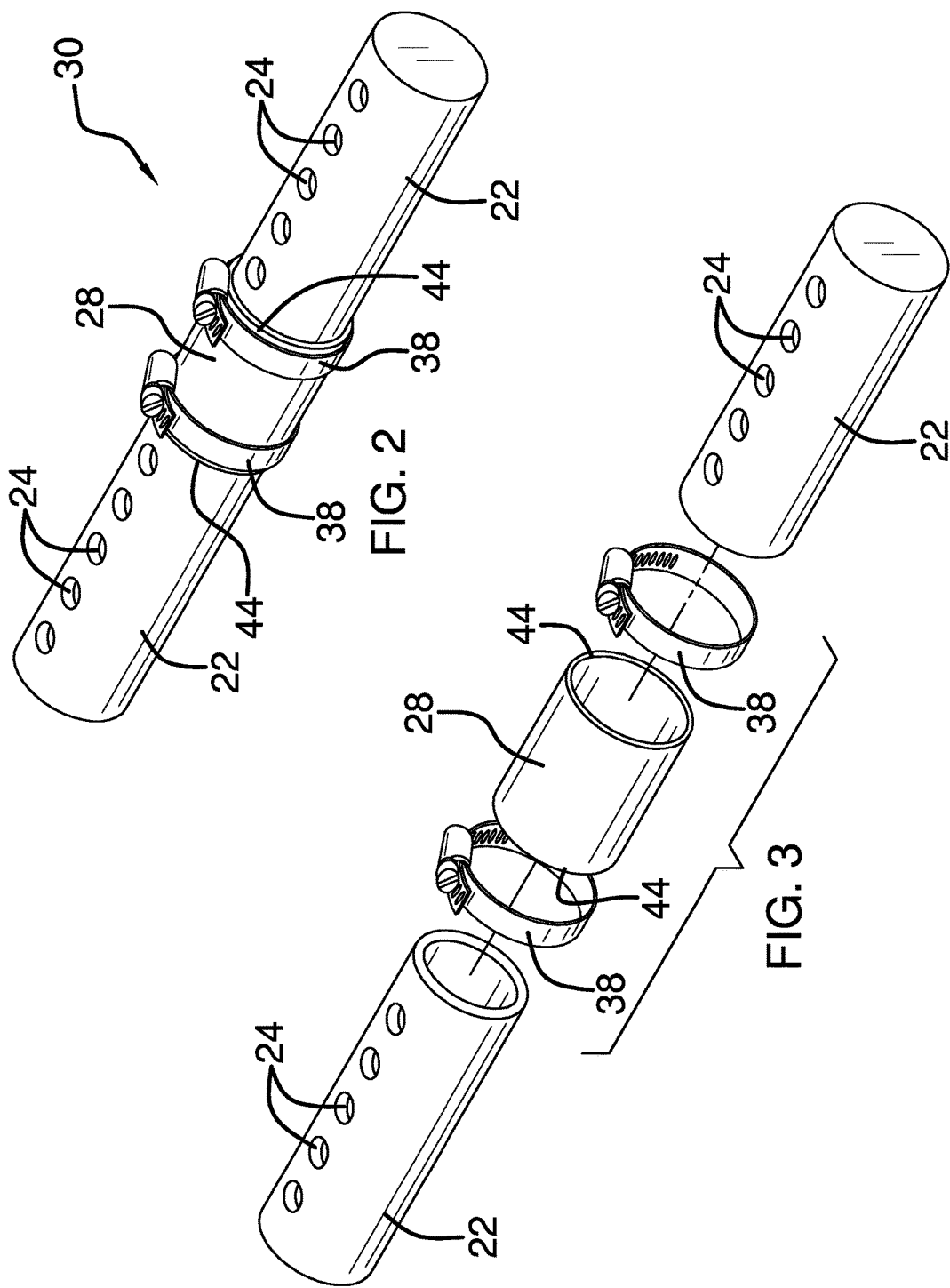

CROP LOSS INHIBITING DEVICE

BACKGROUND OF THE DISCLOSURE

Field of the Disclosure

The disclosure relates to crop loss prevention devices and more particularly pertains to a new crop loss prevention device for directing air flow upwardly into cut plants to prevent crops from falling to the ground from the plants prior to being collected by a combine.

SUMMARY OF THE DISCLOSURE

An embodiment of the disclosure meets the needs presented above by generally comprising a combine having a head including a skid plate and a plurality of spaced cutting projections extending forwardly from the skid plate. The combine has a collector positioned rearwardly from the spaced cutting projections wherein the collector receives and collects plants cut by the spaced cutting projections. Each of a pair of manifold tubes is coupled to the combine rearwardly of the spaced cutting projections. Each of the manifold tubes has a plurality of holes facing upwardly away from the spaced cutting projections. A blower is coupled to the manifold tubes creating air flow out through the holes such that the air flow inhibits crops from falling to the ground prior to being collected by the collector.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top front side perspective view of an embodiment of the disclosure.

FIG. 3 is an exploded top front side perspective view of an embodiment of the disclosure.

DESCRIPTION OF THE PREFERRED EMBODIMENT

Figure 1:
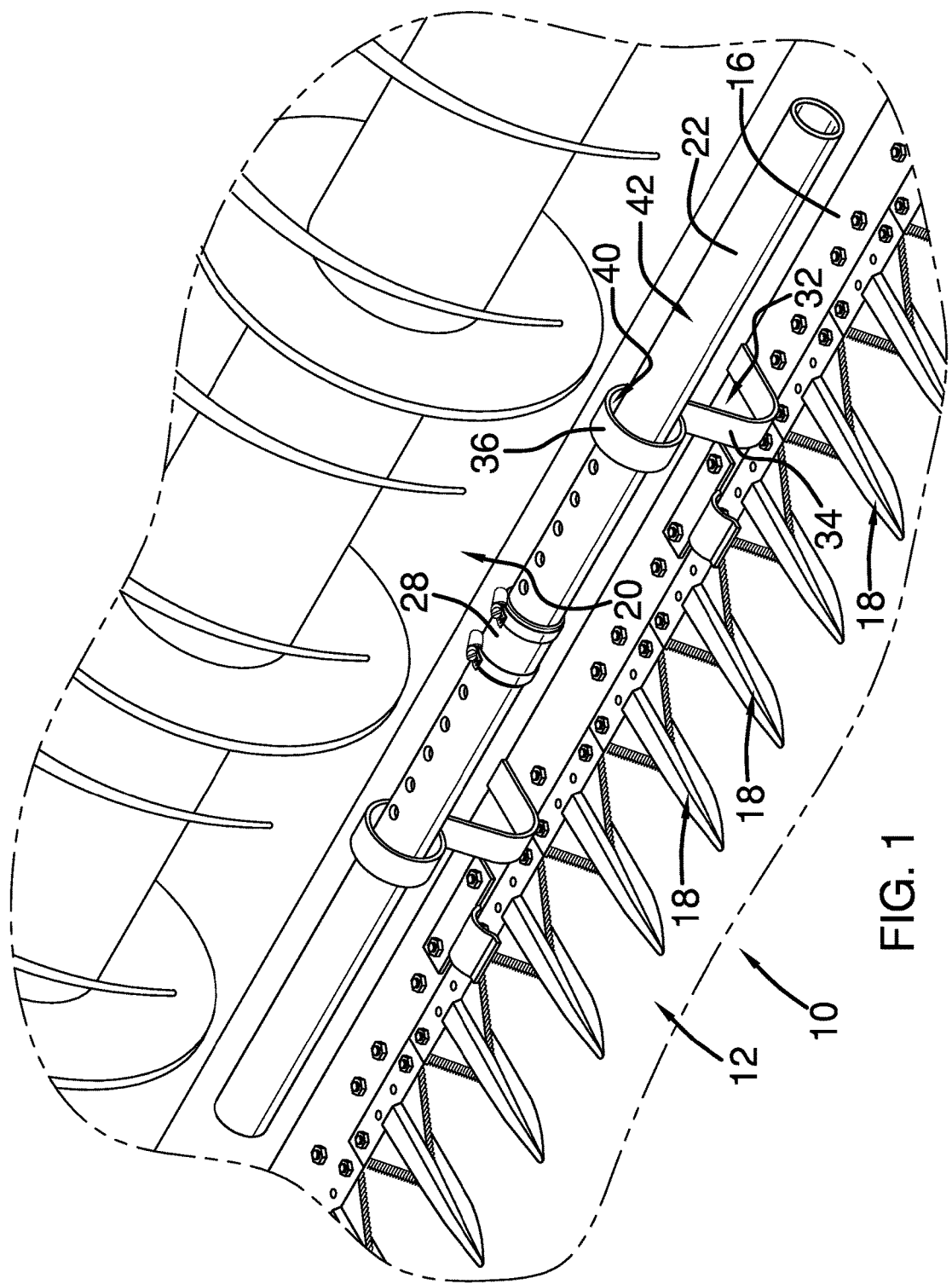
FIG. 1 is a top front side perspective view of a crop loss inhibiting device in use according to an embodiment of the disclosure.
Figure 4:
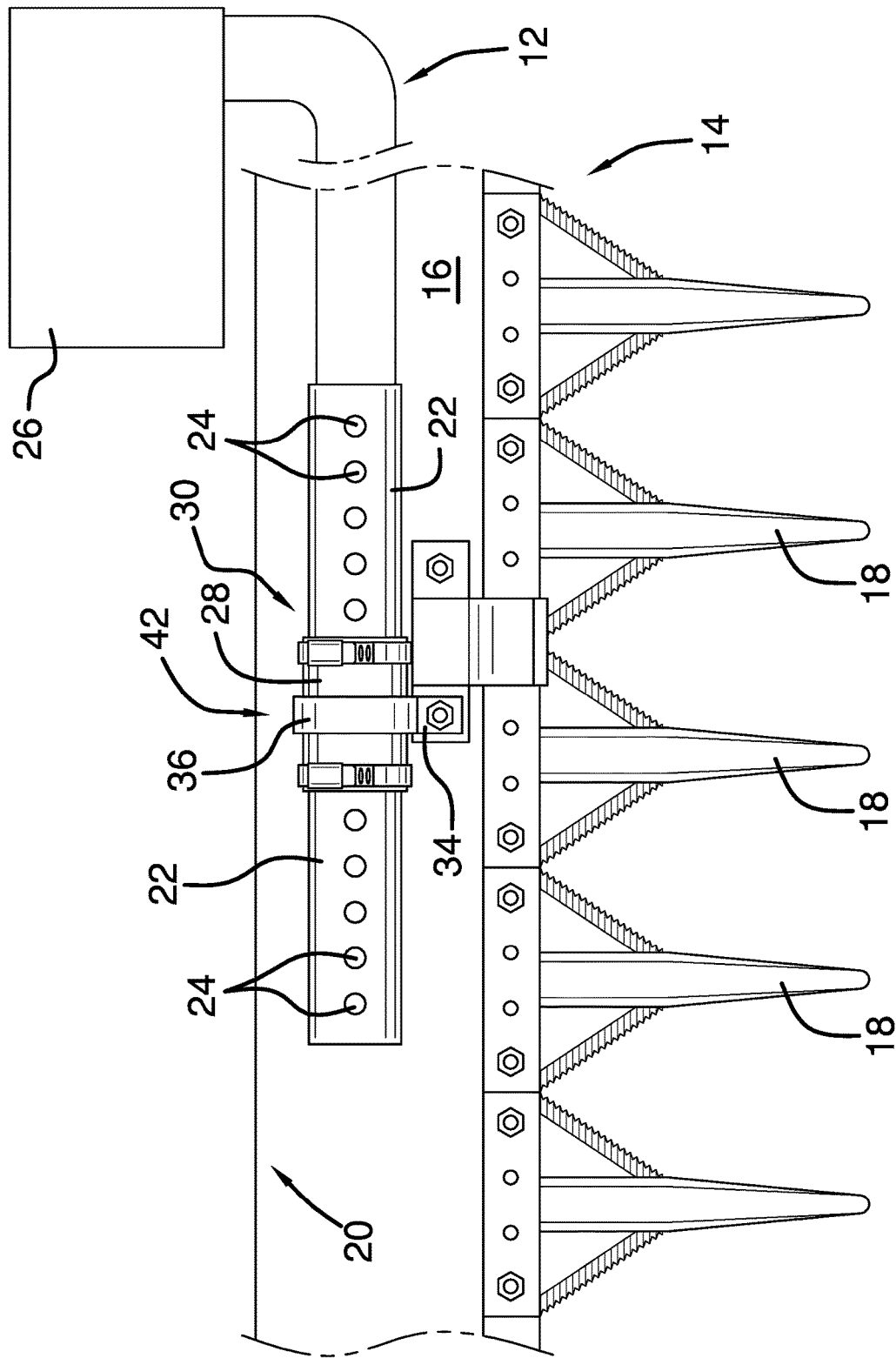
FIG. 4 is a top view of an embodiment of the disclosure.
Figure 5:
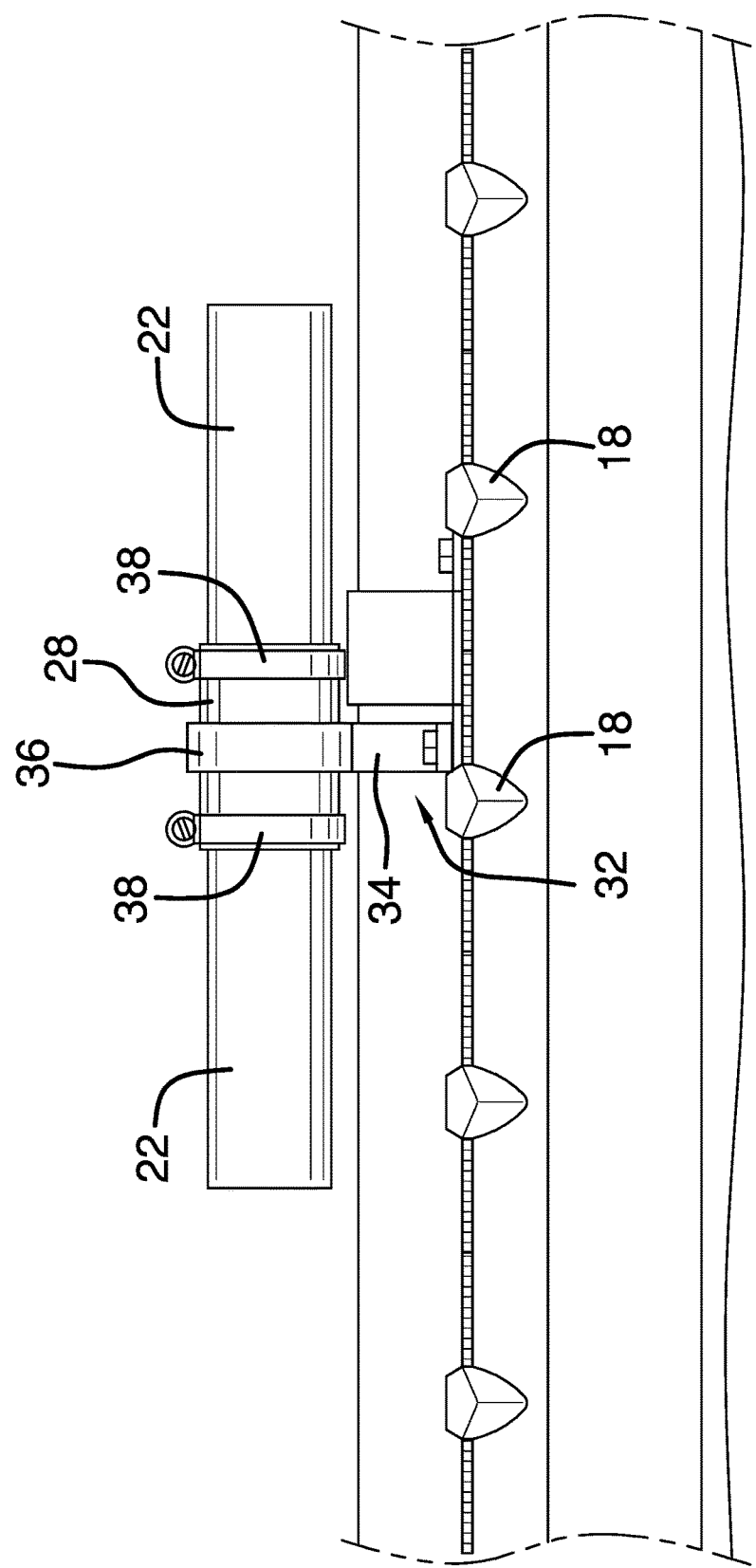
FIG. 5 is a front view of an embodiment of the disclosure.

With reference now to the drawings, and in particular to FIGS. 1 through 5 thereof, a new crop loss prevention device embodying the principles and concepts of an embodiment of the disclosure and generally designated by the reference numeral 10 will be described.

As best illustrated in FIGS. 1 through 5, the crop loss inhibiting device 10 generally comprises a combine 12 having a head 14. The head 14 is of the type conventionally used for harvesting beans and grains including soybeans, wheat, rye, oats, canola, sorghum, flax, and the like. The head 14 includes a skid plate 16 and a plurality of spaced cutting projections 18. The spaced cutting projections 18 extend forwardly from the skid plate 16. The combine 12 has a collector 20 positioned rearwardly from the spaced cutting projections 18 wherein the collector 20 receives and collects plants cut by the spaced cutting projections 18. The collector 20 processes the cut plants in a conventional manner.

Each of a pair of manifold tubes 22 is coupled to the combine 12 rearwardly of the spaced cutting projections 18. Each of the manifold tubes 22 has a plurality of holes 24. The holes 24 of each of the manifold tubes 22 face upwardly away from the spaced cutting projections 18. Each manifold tube 22 may be constructed of poly vinyl chloride material, or the like, such that each manifold tube 22 is substantially stiff. Each manifold tube 22 may have an outer diameter between 3.0 centimeters and 8.0 centimeters and a length between 12.0 centimeters and 18.0 centimeters although longer manifold tubes 22 may be employed. The holes 24 in each manifold tube 22 may be spaced apart between 1.0 centimeters and 3.0 centimeters. A blower 26 is coupled to the combine 12 in a conventional manner. The blower 26 may be attached to the head 14 at either end of the head 14 or another convenient position. The blower 26 is coupled to the manifold tubes 22, using conventional tubing 66 or the like, such that the blower 26 urges a flow of air out through each of the holes 24 of the manifold tubes 22 such that the air flow inhibits crops to be collected from falling to the ground prior to being collected by the collector 20. As the cut plants pass over the manifold tubes 22 the air flow facilitates retention of the crops to be collected within the cut plant until passing to the collector 20.

A medial tube 28 is positioned between and couples together the manifold tubes 22 defining a manifold assembly 30. Opposite ends 44 of the medial tube 28 may be coupled to the manifold tubes 22 using conventional compression clamps 38 or the like. A plurality of manifold assemblies 30 may be utilized and spaced along the head 14 of the combine 12. The medial tube 28 is flexible wherein the manifold tubes 22 are capable of flexing relative to each other during use of the combine 12 to prevent damage to the manifold tubes 22. Each of a plurality of brackets 32 has a loop section 34 and a stand section 36. Each stand section 34 is coupled to the combine 12 proximate the spaced cutting projections 18. Each loop section 36 receives therethrough an associated one of the manifold tubes 22. Each loop section 36 has an interior diameter 40 greater than an outer diameter 42 of the associated manifold tube 22 wherein the associated manifold tube 22 has space to move within the loop section 36. This allows for movement to reduce stress in the manifold tubes 22 during use.

In use, the blower 26 is activated to force air flow through the holes 24 to inhibit beans, grains, or the like from falling to the ground instead of passing into the collector 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A crop loss inhibiting device comprising:
   a combine having a head, said head including a skid plate and a plurality of spaced cutting projections, said space cutting projections extending forwardly from said skid plate, said combine having a collector positioned rearwardly from said spaced cutting projections wherein said collector receives and collects plants cut by said spaced cutting projections;
   a pair of manifold tubes, said manifold tubes being coupled to said combine rearwardly of said spaced cutting projections, each of said manifold tubes having a plurality of holes, said holes of each of said manifold tubes facing upwardly away from said spaced cutting projections; and
   a blower coupled to said combine, said blower being coupled to said manifold tubes such that said blower urges a flow of air out through each of said holes of said manifold tubes such that the air flow inhibits crops from falling to the ground prior to being collected by said collector; and
   a medial tube, said medial tube being positioned between and coupling together said manifold tubes, said medial tube being flexible wherein said manifold tubes are capable of flexing relative to each other during use of said combine.

2. The device of claim 1, further comprising a plurality of brackets, each said bracket having a loop section and a stand section, each said stand section being coupled to said combine proximate said spaced cutting projections, each said loop section receiving therethrough an associated one of said manifold tubes.

3. The device of claim 2, further comprising each said loop section having an interior diameter greater than an outer diameter of said associated manifold tube wherein said associated manifold tube has space to move within said loop section.

4. The device of claim 1, further comprising each said manifold tube having an outer diameter between 3.0 centimeters and 8.0 centimeters.

5. The device of claim 1, further comprising each said manifold tube having a length between 12.0 centimeters and 18.0 centimeters.

6. The device of claim 1, further comprising said holes in each said manifold tube being spaced apart between 1.0 centimeters and 3.0 centimeters.

7. The device of claim 1, further comprising each said manifold tube being constructed of poly vinyl chloride material.

8. A crop loss inhibiting device comprising:
   a combine having a head, said head including a skid plate and a plurality of spaced cutting projections, said space cutting projections extending forwardly from said skid plate, said combine having a collector positioned rearwardly from said spaced cutting projections wherein said collector receives and collects plants cut by said spaced cutting projections;
   a pair of manifold tubes, said manifold tubes being coupled to said combine rearwardly of said spaced cutting projections, each of said manifold tubes having a plurality of holes, said holes of each of said manifold tubes facing upwardly away from said spaced cutting projections;
   a blower coupled to said combine, said blower being coupled to said manifold tubes such that said blower urges a flow of air out through each of said holes of said manifold tubes such that the air flow inhibits crops from falling to the ground prior to being collected by said collector; and
   a plurality of brackets, each said bracket having a loop section and a stand section, each said stand section being coupled to said combine proximate said spaced cutting projections, each said loop section receiving therethrough an associated one of said manifold tubes.

9. The device of claim 8, further comprising each said loop section having an interior diameter greater than an outer diameter of said associated manifold tube wherein said associated manifold tube has space to move within said loop section.

10. A crop loss inhibiting device comprising:
    a combine having a head, said head including a skid plate and a plurality of spaced cutting projections, said space cutting projections extending forwardly from said skid plate, said combine having a collector positioned rearwardly from said spaced cutting projections wherein said collector receives and collects plants cut by said spaced cutting projections;
    a pair of manifold tubes, said manifold tubes being coupled to said combine rearwardly of said spaced cutting projections, each of said manifold tubes having a plurality of holes, said holes of each of said manifold tubes facing upwardly away from said spaced cutting projections, each said manifold tube being constructed of poly vinyl chloride material, each said manifold tube having an outer diameter between 3.0 centimeters and 8.0 centimeters, each said manifold tube having a length between 12.0 centimeters and 18.0 centimeters, said holes in each said manifold tube being spaced apart between 1.0 centimeters and 3.0 centimeters;
    a medial tube, said medial tube being positioned between and coupling together said manifold tubes, said medial tube being flexible wherein said manifold tubes are capable of flexing relative to each other during use of said combine;
    a plurality of brackets, each said bracket having a loop section and a stand section, each said stand section being coupled to said combine proximate said spaced cutting projections, each said loop section receiving therethrough an associated one of said manifold tubes, each said loop section having an interior diameter greater than an outer diameter of said associated manifold tube wherein said associated manifold tube has space to move within said loop section; and
    a blower coupled to said combine, said blower being coupled to said manifold tubes such that said blower urges a flow of air out through each of said holes of said manifold tubes such that the air flow inhibits crops from falling to the ground prior to being collected by said collector.

* * * * *